United States Patent
Chang et al.

(10) Patent No.: US 11,711,865 B2
(45) Date of Patent: Jul. 25, 2023

(54) DETECTION OF RRC CONNECTION REESTABLISHMENT WITHOUT RECONFIGURATION IN MOBILE COMMUNICATIONS

(71) Applicant: MediaTek Inc., Hsinchu (TW)

(72) Inventors: Yu-Lun Chang, Hsinchu (TW); Shih Chieh Liao, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/138,863

(22) Filed: Dec. 30, 2020

(65) Prior Publication Data

US 2022/0210855 A1 Jun. 30, 2022

(51) Int. Cl.
*H04W 76/19* (2018.01)
*H04W 76/27* (2018.01)

(52) U.S. Cl.
CPC ........... *H04W 76/19* (2018.02); *H04W 76/27* (2018.02)

(58) Field of Classification Search
CPC ..... H04W 12/04; H04W 12/06; H04W 12/10; H04W 12/1006; H04W 74/0833; H04W 76/028; H04W 76/046; H04W 28/0268; H04W 36/023; H04W 76/19; H04W 76/26; H04W 76/27
See application file for complete search history.

(56) References Cited

U.S. PATENT DOCUMENTS

| | | | | |
|---|---|---|---|---|
| 9,504,082 B2* | 11/2016 | Johansson | ......... | H04W 36/0061 |
| 9,999,086 B2* | 6/2018 | Gunnarsson | ........ | H04W 36/023 |
| 11,026,291 B2* | 6/2021 | Sharma | ................. | H04W 80/02 |
| 11,202,336 B2* | 12/2021 | Tsai | ....................... | H04W 76/19 |
| 2012/0202228 A1* | 8/2012 | Gennaro | ................ | G01N 33/53 |
| | | | | 435/7.92 |
| 2016/0353511 A1* | 12/2016 | Gunnarsson | ......... | H04W 76/19 |
| 2019/0274074 A1* | 9/2019 | Lee | ......................... | H04W 76/27 |
| 2020/0128604 A1* | 4/2020 | Teyeb | ................... | H04W 76/27 |
| 2020/0169456 A1* | 5/2020 | Park | ..................... | H04B 7/0626 |
| 2020/0214070 A1* | 7/2020 | Ingale | ............... | H04W 74/0833 |
| 2020/0267793 A1* | 8/2020 | Sharma | ................ | H04W 28/02 |
| 2021/0144610 A1* | 5/2021 | Xu | ........................ | H04W 36/08 |
| 2021/0360730 A1* | 11/2021 | Kim | ..................... | H04W 76/28 |

FOREIGN PATENT DOCUMENTS

| CN | 109155914 A | 1/2019 |
|---|---|---|
| CN | 110572848 A | 12/2019 |

OTHER PUBLICATIONS

Taiwan Intellectual Property Office, Office Action for Taiwan Patent Application No. 110140716, dated Mar. 24, 2022.

* cited by examiner

*Primary Examiner* — Jean A Gelin

(74) *Attorney, Agent, or Firm* — Han IP PLLC; Andy M. Han

(57) ABSTRACT

Examples pertaining to detection of radio resource control (RRC) reestablishment without reconfiguration in mobile communications. An apparatus reestablishes a RRC connection with a wireless network. The apparatus then detects whether a type of radio bearer service is resumed upon reestablishing the RRC connection. In response to detecting that the type of radio bearer service is not resumed, the apparatus resumes the type of radio bearer service.

19 Claims, 4 Drawing Sheets

300

```
┌─────────────────────────────────────────┐
│  REESTABLISH, BY A PROCESSOR OF AN      │
│  APPARATUS, A RADIO RESOURCE CONTROL    │
│  (RRC) CONNECTION WITH A WIRELESS       │
│  NETWORK                                │
│                  310                    │
└─────────────────────────────────────────┘
                   │
                   ▼
┌─────────────────────────────────────────┐
│  DETECT, BY THE PROCESSOR, WHETHER A    │
│  TYPE OF RADIO BEARER SERVICE IS        │
│  RESUMED UPON REESTABLISHING THE RRC    │
│  CONNECTION                             │
│                  320                    │
└─────────────────────────────────────────┘
                   │
                   ▼
┌─────────────────────────────────────────┐
│  RESUME, BY THE PROCESSOR, THE TYPE OF  │
│  RADIO BEARER SERVICE RESPONSIVE TO     │
│  DETECTING THAT THE TYPE OF RADIO       │
│  BEARER SERVICE IS NOT RESUMED          │
│                  330                    │
└─────────────────────────────────────────┘
```

FIG. 3

DETECTION OF RRC CONNECTION REESTABLISHMENT WITHOUT RECONFIGURATION IN MOBILE COMMUNICATIONS

TECHNICAL FIELD

The present disclosure is generally related to mobile communications and, more particularly, to techniques pertaining to detection of radio resource control (RRC) reestablishment without reconfiguration in mobile communications.

BACKGROUND

Unless otherwise indicated herein, approaches described in this section are not prior art to the claims listed below and are not admitted as prior art by inclusion in this section.

According to the $3^{rd}$ Generation Partnership Project (3GPP) specifications, RRC connection reestablishment can be triggered by a user equipment (UE) based on a number of conditions such as radio link failure (RLF), reconfiguration failure, handover failure, integrity check (e.g., checksum) error, and mobility from Evolved Universal Mobile Telecommunications System (UMTS) Terrestrial Radio Access (E-UTRA) failure (e.g., $4^{th}$ Generation (4G) handover failure). Under the 3GPP technical specification (TS) 36.331, data transmission of signaling radio bearer (SRB) type 1 (SRB1) is resumed when reestablishment is completed. Next, a network would send reconfiguration with SRB type 2 (SRB2) and data radio bearer (DRB) information to resume radio bearer (RB) service. That is, with RRC connection reestablishment, SRB1 is reconfigured to resume data on SRB1 and restart access stratum (AS) security. However, because of RRC connection reestablishment, services on SRB2 and DRB are suspended and need to be resumed. In case that the network did not send a RRC reconfiguration message or in case that RRC reconfiguration message is missing after the reestablishment is conducted, an ongoing service (e.g., voice over Long-Term Evolution (VoLTE) or file transfer protocol (FTP) download) could be suspended due to DRB being suspended. Consequently, user experience would be negatively impacted. Therefore, there is a need to detect such a scenario so as to avoid SRB2 and DRB being suspended for a long time.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to propose various schemes, concepts, designs, techniques, methods and apparatuses to address the aforementioned issue. For instance, it is believed that some proposed schemes in accordance with the present disclosure would avoid SRB2 and DRB being suspended for a long time.

In one aspect, a method may involve a processor of an apparatus reestablishing a RRC connection with a wireless network. The method may also involve the processor detecting whether a type of radio bearer service is resumed upon reestablishing the RRC connection. The method may further involve the processor resuming the type of radio bearer service responsive to detecting that the type of radio bearer service is not resumed.

In another aspect, a method may involve a processor of an apparatus reestablishing a RRC connection with a wireless network. The method may also involve the processor detecting whether a SRB2 service or a DRB service is resumed upon reestablishing the RRC connection by utilizing one or more of a plurality of detection mechanisms comprising an upper layer-driven detection mechanism, a timer-driven detection mechanism, and a lower layer-driven detection mechanism. The method may further involve the processor resuming the SRB2 service or the DRB service responsive to detecting that the SRB2 service or the DRB service is not resumed by utilizing one or more of a plurality of recovery mechanisms comprising an first recovery mechanism involving releasing the RRC connection, a second recovery mechanism involving reestablishing a cell connection, and a third recovery mechanism involving resynchronization with the wireless network.

It is noteworthy that, although description provided herein may be in the context of certain radio access technologies, networks and network topologies such as $5^{th}$ Generation (5G)/New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial Internet-of-Things (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to detection of RRC connection reestablishment without reconfiguration in mobile communications. According to the present disclosure, a number of possible solutions may be implemented separately or jointly. That is, although these possible solutions may be described below separately, two or more of these possible solutions may be implemented in one combination or another.

Figure 1:
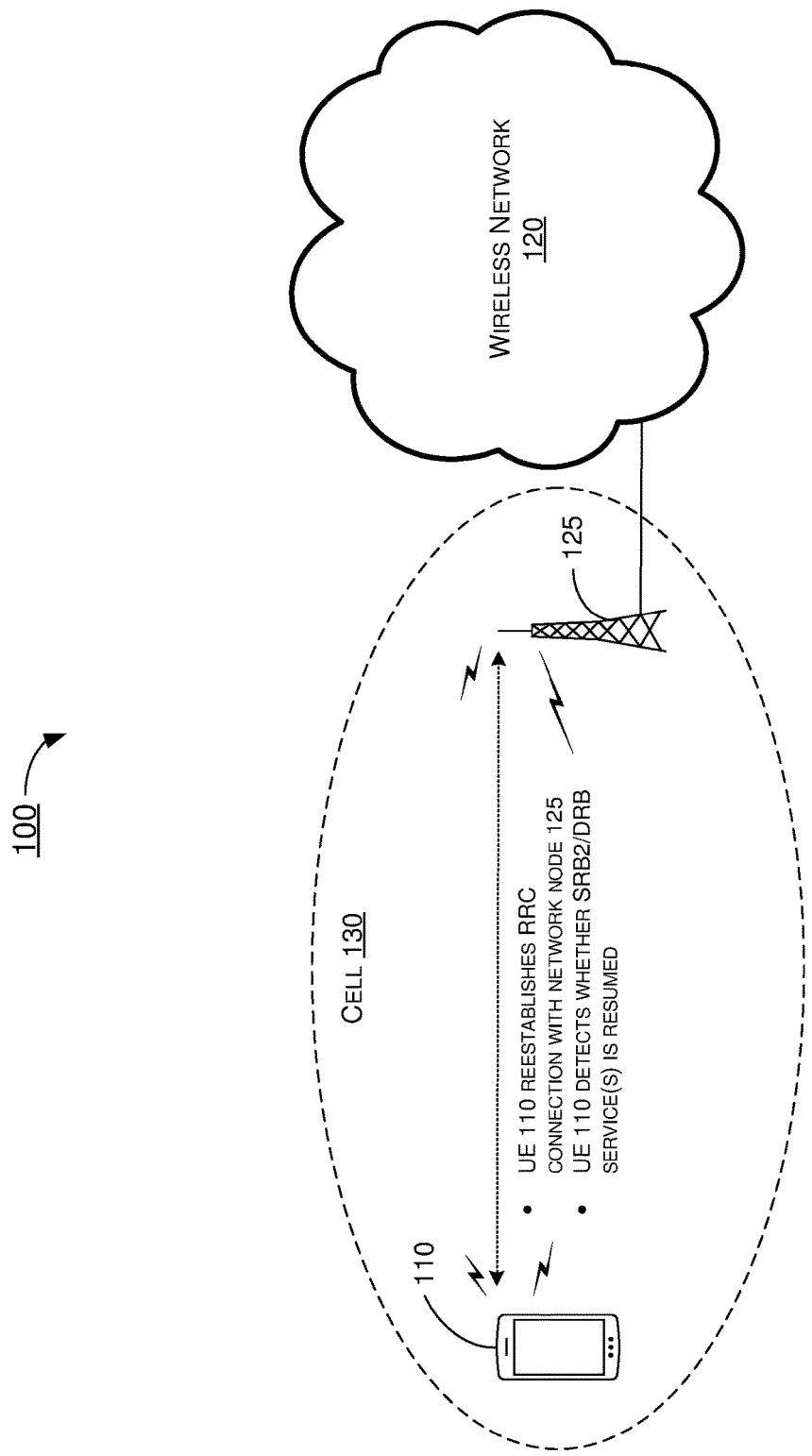
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network) via a base station or network node 125 (e.g., an eNB, gNB or transmit-receive point (TRP)). In network environment 100, UE 110 and wireless network 120 may implement various schemes pertaining to RRC connection reestablishment without reconfiguration detection mechanism in mobile communications in accordance with the present disclosure, as described herein.

Under various proposed schemes in accordance with the present disclosure, one or more of multiple detection mechanisms may be implemented to detect a scenario that UE 110 does not have SRB2 and DRB service once RRC connection reestablishment is finished. A first detection mechanism may involve upper layer-driven detection. A second detection mechanism may involve timer-driven detection. A third detection mechanism may involve lower-layer RLF monitoring.

In implementing the first detection mechanism, an upper layer may monitor a group of certain services such as, for example and without limitation, an Evolved Packet System (EPS) Mobility Management (EMM) service, an EPS Session Management (ESM) service, an application service, and a VoLTE service. In an event that a lower layer cannot achieve one of the above-listed services, an application may request the lower layer to handle the scenario (that UE 110 does not have SRB2 and DRB service due to RRC connection reestablishment) to improve user experience. The terms "upper layer" and "lower layer" here refer to an application layer or a non-access stratum (NAS) layer, and the term "lower layer" may refer to a RRC layer.

In implementing the second detection mechanism, after RRC connection reestablishment, a RRC reconfiguration message for SRB2 and DRB establishment may be received in a specific time. For instance, after RRC connection reestablishment, UE 110 may check whether a RRC reconfiguration message has been received from network node 125 to resume the SRB2/DRB service within a predefined period based on a timer (e.g., 10 seconds).

In implementing the third detection mechanism, a lower layer (e.g., RRC layer) may monitor whether RLF has occurred. For instance, in an event that a signal level is low (e.g., below a predefined threshold), the lower layer may not be able to decode a message (e.g., RRC reconfiguration message) and, thus, may indicate RLF to an upper layer. The UE may determine whether RLF has occurred according to other conditions specified in 3GPP Technical Specification (TS) 36.331. Alternatively, UE 110 may keep receiving the same data from network node 125 and still cannot be recovered by radio link control (RLC) status report. Moreover, UE 110 may regard network node 125 (and wireless network 120) as being not synchronized.

Under various proposed schemes in accordance with the present disclosure, in an event that the scenario (that UE 110 does not have SRB2 and DRB service due to RRC connection reestablishment) is detected by any of the above-described detection mechanisms, UE 110 may utilize one or more of multiple recovery mechanisms to recover SRB2 and DRB services. A first recovery mechanism may involve UE 110 releasing itself. A second recovery mechanism may involve UE 110 reestablishing again. A third recovery mechanism may involve UE 110 triggering Layer 2 (L2) control signaling and/or procedure to resynchronize with network node 125 (and wireless network 120).

In implementing the first recovery mechanism, UE 110 may release itself. For instance, in an event that a paging message (for a mobile-terminated (MT) call service) is received, UE 110 may trigger a local release of its RRC connection with network node 125 to enter into an idle mode. Afterwards, UE 110 may establish connection again to enter a connected mode from the idle mode to resume SRB2 and DRB services. In this case, UE 110 may avoid the lack of SRB2 and DRB services.

In implementing the second recovery mechanism, UE 110 may reestablish a cell connection. Specifically, UE 110 may trigger reestablishment again (to re-attempt RRC reconfiguration) and determine whether network node 125 resumes the SRB2 and DRB services. However, UE 110 may keep suffering the same issue on a cell 130 associated with network node 125 in case that UE 110 remains in the situation in a short time. Thus, cell 130 should not be camped on by UE 110 through a bar cell mechanism according to the 3GPP specifications, and UE 110 may attempt to camp on a different cell (not shown) other than cell 130.

In implementing the third recovery mechanism, UE 110 may trigger L2 control signaling and/or procedure to resynchronize with network node 125 (and wireless network 120). For instance, UE 110 may trigger an Evolved Packet Data Converge Protocol (EPDCP) or Enhanced Relay Link Capacity (ERLC) status report. Additionally, or alternatively, UE 110 may send a buffer status report (BSR) or scheduling request (SR) or UE 110 may trigger another random access (RA) procedure.

Under a proposed scheme in accordance with the present disclosure, in attempting to recover SRB2 and DRB services upon detecting the scenario that UE 110 does not have SRB2 and DRB service once RRC connection reestablishment is finished (e.g., by using one, some or all of the various detection mechanisms), UE 110 may select one of the multiple recovery mechanisms (e.g., the first recovery mechanism or the third recovery mechanism) to attempt to resume the SRB2 and DRB services. If the selected recovery mechanism does not result in a success in resuming the SRB2 and DRB services, UE 110 may select another of the multiple recovery mechanisms (e.g., the second recovery mechanism) to attempt to resume the SRB2 and DRB services. Under the proposed scheme, UE 110 may implement some or all of the recovery mechanisms one after another in a random order or in a predetermined order (e.g., the first recovery mechanism first, then the third recovery mechanism if the first recovery mechanism is not successful, followed by the second recovery mechanism if both the first and third recovery mechanisms are not successful). Moreover, UE 110 may repeat implementation of the recovery mechanisms in the same order or in different order(s) until the SRB2 and DRB services are resumed.

Illustrative Implementations

Figure 2:
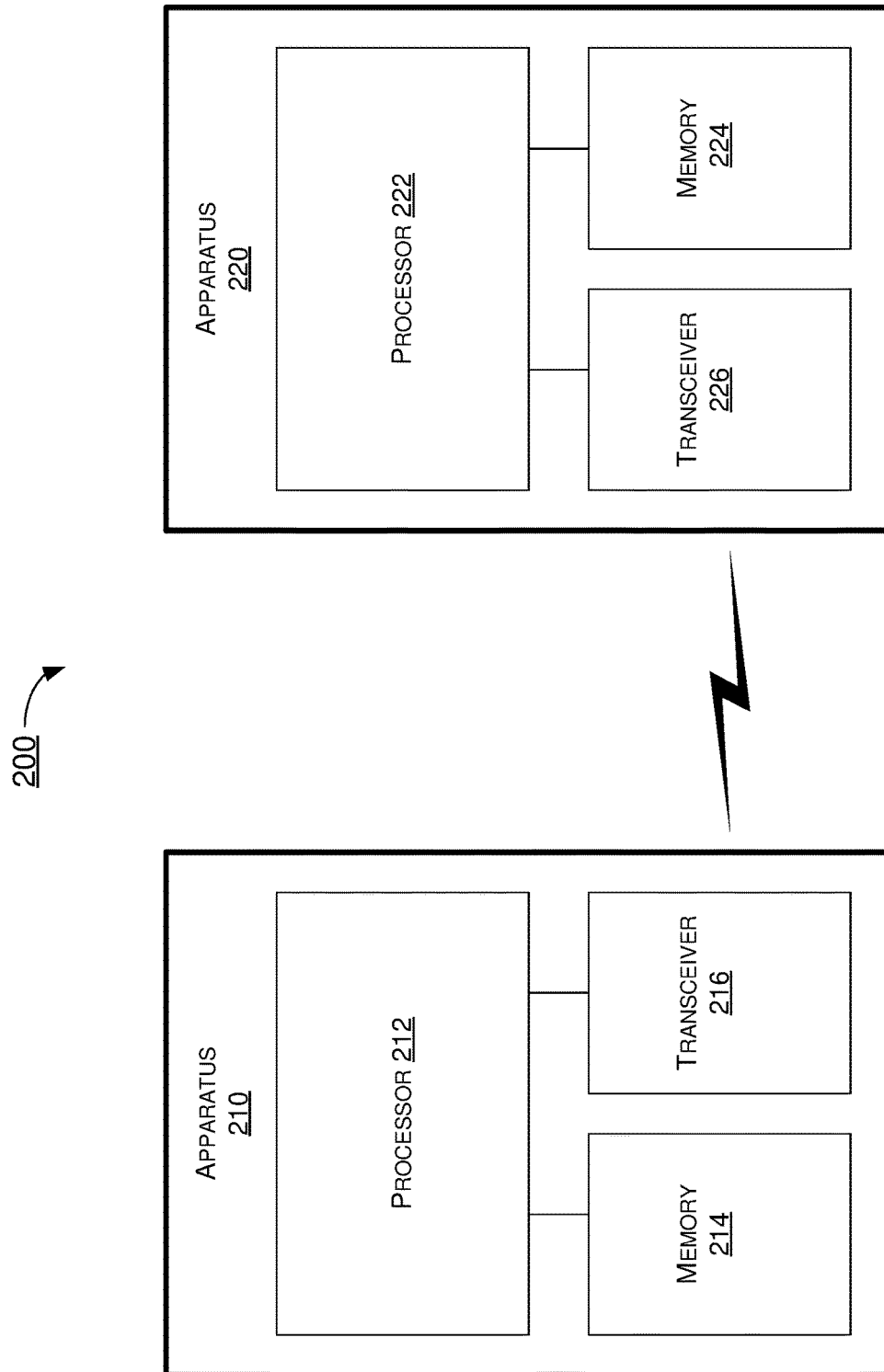
FIG. 2 is a block diagram of an example communication system in accordance with an implementation of the present disclosure.

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to detection of RRC connection reestablishment without reconfiguration in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to detection of RRC connection reestablishment without reconfiguration in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., network node 125) of a wireless network (e.g., wireless network 120 as a 5G/NR mobile network), is provided below.

In one aspect of detection of RRC connection reestablishment without reconfiguration in mobile communications in accordance with the present disclosure, processor 212 of apparatus 210 may reestablish, via transceiver 216, a RRC connection with a wireless network (e.g., wireless network 120) via apparatus 220. For instance, processor 212 may trigger the RRC connection with apparatus 220 based on one or a plurality of conditions such as, for example and without limitation, RLF, reconfiguration failure, handover failure, integrity check (e.g., checksum) error, and 4G handover failure. Moreover, processor 212 may detect, via transceiver 216, whether a type of radio bearer service is resumed upon reestablishing the RRC connection. Additionally, processor 212 may resume, via transceiver 216, the type of radio bearer service responsive to detecting that the type of radio bearer service is not resumed.

In some implementations, the type of radio bearer service may include a SRB2 service or a DRB service.

In some implementations, in detecting whether the type of radio bearer service is resumed, processor 212 may detect by utilizing one or more of a plurality of detection mechanisms comprising: (i) an upper layer-driven detection mechanism, (ii) a timer-driven detection mechanism, and (iii) a lower layer-driven detection mechanism.

In some implementations, the upper layer-driven detection mechanism may involve monitoring one or more of a plurality of services at an application layer or a NAS layer to determine whether the type of radio bearer service is resumed upon reestablishing the RRC connection. In some implementations, the plurality of services comprise an EMM service, an ESM service, an application service, and a VoLTE service.

In some implementations, the timer-driven detection mechanism may involve determining, based on a timer, whether the type of radio bearer service is resumed within a predefined period.

In some implementations, the lower layer-driven detection mechanism may involve monitoring for an occurrence of RLF at a RRC layer. In some implementations, in monitoring for the occurrence of RLF, processor 212 may detect a failure in message decoding due to a signal level of the message being below a predefined threshold.

In some implementations, in resuming the type of radio bearer service, processor 212 may resume by utilizing one or more of a plurality of recovery mechanisms comprising: (i) an first recovery mechanism involving releasing the RRC connection, (ii) a second recovery mechanism involving reestablishing a cell connection, and (iii) a third recovery mechanism involving resynchronization with the wireless network.

In some implementations, the first recovery mechanism may involve: (1a) releasing the RRC connection to enter an idle mode in response to receiving a paging message (e.g., for a mobile-terminated call service); and (1b) reestablishing a connection with the wireless network to enter a connected mode from the idle mode to resume the type of radio bearer service.

In some implementations, the second recovery mechanism may involve: (2a) triggering reestablishment with a first cell (e.g., cell 130) associated with the wireless network; (2b) determining whether the type of radio bearer service is resumed upon reestablishment with the first cell; and (2c) triggering reestablishment with a second cell associated with the wireless network responsive to determining that the type of radio bearer service is not resumed upon reestablishment with the first cell.

In some implementations, the third recovery mechanism may involve triggering a L2 control signaling or procedure to resynchronize with the wireless network. In some implementations, in triggering the L2 control signaling or procedure, processor 212 may perform one or more of: (i) triggering an EPDCP or ERLC status report; (ii) transmitting a BSR or SR to the wireless network; and (iii) triggering a RA procedure with the wireless network.

Illustrative Processes

FIG. 3 illustrates an example process 300 in accordance with an implementation of the present disclosure. Process 300 may represent an aspect of implementing various proposed designs, concepts, schemes, systems and methods described above, whether partially or entirely, including those pertaining to FIG. 1 and FIG. 2. More specifically, process 300 may represent an aspect of the proposed concepts and schemes pertaining to detection of RRC connection reestablishment without reconfiguration in mobile communications. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., network node 125) of a wireless network (e.g., wireless network 120). Process 300 may begin at block 310.

At 310, process 300 may involve processor 212 of apparatus 210 reestablishing, via transceiver 216, a RRC connection with a wireless network (e.g., wireless network 120) via apparatus 220. Process 300 may proceed from 310 to 320.

At 320, process 300 may involve processor 212 detecting, via transceiver 216, whether a type of radio bearer service is resumed upon reestablishing the RRC connection. Process 300 may proceed from 320 to 330.

At 330, process 300 may involve processor 212 resuming, via transceiver 216, the type of radio bearer service responsive to detecting that the type of radio bearer service is not resumed.

In some implementations, the type of radio bearer service may include a SRB2 service or a DRB service.

In some implementations, in detecting whether the type of radio bearer service is resumed, process 300 may involve processor 212 detecting by utilizing one or more of a plurality of detection mechanisms comprising: (i) an upper layer-driven detection mechanism, (ii) a timer-driven detection mechanism, and (iii) a lower layer-driven detection mechanism.

In some implementations, the upper layer-driven detection mechanism may involve monitoring one or more of a plurality of services at an application layer or a NAS layer to determine whether the type of radio bearer service is resumed upon reestablishing the RRC connection. In some implementations, the plurality of services comprise an EMM service, an ESM service, an application service, and a VoLTE service.

In some implementations, the timer-driven detection mechanism may involve determining, based on a timer, whether the type of radio bearer service is resumed within a predefined period.

In some implementations, the lower layer-driven detection mechanism may involve monitoring for an occurrence of RLF at a RRC layer. In some implementations, in monitoring for the occurrence of RLF, process 300 may involve processor 212 detecting a failure in message decoding due to a signal level of the message being below a predefined threshold.

In some implementations, in resuming the type of radio bearer service, process 300 may involve processor 212 resuming by utilizing one or more of a plurality of recovery mechanisms comprising: (i) an first recovery mechanism involving releasing the RRC connection, (ii) a second recovery mechanism involving reestablishing a cell connection, and (iii) a third recovery mechanism involving resynchronization with the wireless network.

In some implementations, the first recovery mechanism may involve: (1a) releasing the RRC connection to enter an idle mode in response to receiving a paging message (e.g., for a mobile-terminated call service); and (1b) reestablishing a connection with the wireless network to enter a connected mode from the idle mode to resume the type of radio bearer service.

In some implementations, the second recovery mechanism may involve: (2a) triggering reestablishment with a first cell (e.g., cell 130) associated with the wireless network; (2b) determining whether the type of radio bearer service is resumed upon reestablishment with the first cell; and (2c) triggering reestablishment with a second cell associated with the wireless network responsive to determining that the type of radio bearer service is not resumed upon reestablishment with the first cell.

In some implementations, the third recovery mechanism may involve triggering a L2 control signaling or procedure to resynchronize with the wireless network. In some implementations, in triggering the L2 control signaling or procedure, process 300 may involve processor 212 performing one or more of: (i) triggering an EPDCP or ERLC status report; (ii) transmitting a BSR or SR to the wireless network; and (iii) triggering a RA procedure with the wireless network.

Figure 4:
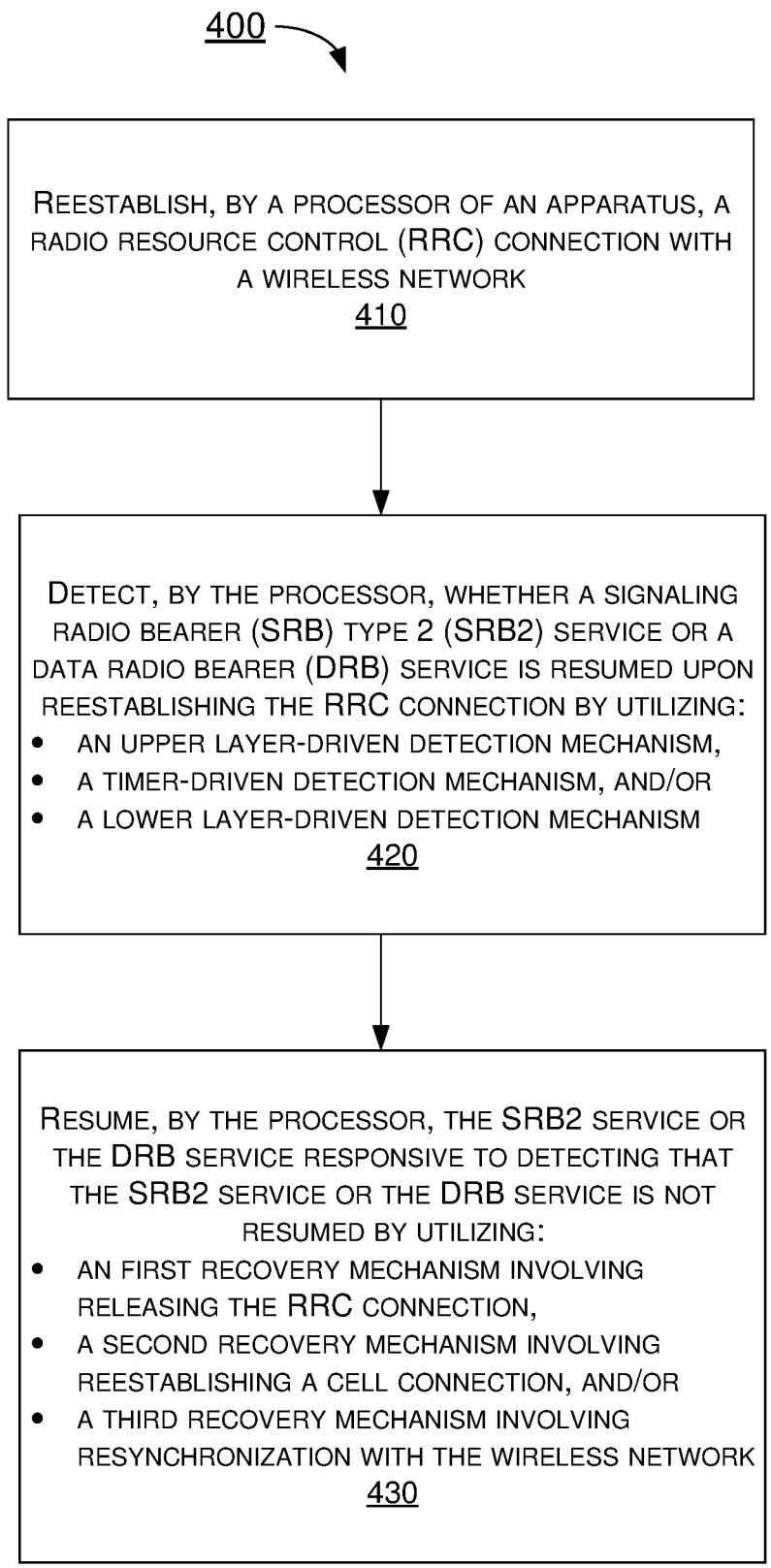
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to FIG. 1 and FIG. 2. More specifically, process 400 may represent an aspect of the proposed concepts and schemes pertaining to detection of RRC connection reestablishment without reconfiguration in mobile communications. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a communication entity such as a network node or base station (e.g., network node 125) of a wireless network (e.g., wireless network 120). Process 400 may begin at block 410.

At 410, process 400 may involve processor 212 of apparatus 210 reestablishing, via transceiver 216, a RRC connection with a wireless network (e.g., wireless network 120) via apparatus 220. Process 400 may proceed from 410 to 420.

At 420, process 400 may involve processor 212 detecting, via transceiver 216, whether a SRB2 service or a DRB service is resumed upon reestablishing the RRC connection by utilizing one or more of a plurality of detection mechanisms comprising: (i) an upper layer-driven detection mechanism, (ii) a timer-driven detection mechanism, and (iii) a lower layer-driven detection mechanism. Process 400 may proceed from 420 to 430.

At 430, process 400 may involve processor 212 resuming, via transceiver 216, the SRB2 service or the DRB service responsive to detecting that the SRB2 service or the DRB service is not resumed by utilizing one or more of a plurality of recovery mechanisms comprising: (i) an first recovery mechanism involving releasing the RRC connection, (ii) a second recovery mechanism involving reestablishing a cell connection, and (iii) a third recovery mechanism involving resynchronization with the wireless network.

In some implementations, the upper layer-driven detection mechanism may involve monitoring one or more of a plurality of services at an application layer or a NAS layer to determine whether the SRB2 service or the DRB service is resumed upon reestablishing the RRC connection. Moreover, the plurality of services may include an EMM service, an ESM service, an application service, and a VoLTE service.

In some implementations, the timer-driven detection mechanism may involve determining, based on a timer, whether the SRB2 or the DRB service is resumed within a predefined period.

In some implementations, the lower layer-driven detection mechanism may involve monitoring for an occurrence of RLF at a RRC layer. In some implementations, in monitoring for the occurrence of RLF, process 400 may involve processor 212 detecting a failure in message decoding due to a signal level of the message being below a predefined threshold.

In some implementations, the first recovery mechanism may involve: (1a) releasing the RRC connection to enter an idle mode in response to receiving a paging message (e.g., for a mobile-terminated call service); and (1b) reestablishing a connection with the wireless network to enter a connected mode from the idle mode to resume the SRB2 service or the DRB service.

In some implementations, the second recovery mechanism may involve: (2a) triggering reestablishment with a first cell associated with the wireless network; (2b) determining whether the SRB2 service or the DRB service is resumed upon reestablishment with the first cell; and (2c) triggering reestablishment with a second cell associated with the wireless network responsive to determining that the SRB2 service or the DRB service is not resumed upon reestablishment with the first cell.

In some implementations, the third recovery mechanism may involve triggering a L2 control signaling or procedure to resynchronize with the wireless network. In some implementations, in triggering the L2 control signaling or procedure, process 400 may involve processor 212 performing one or more of: (i) triggering an EPDCP or ERLC status report; (ii) transmitting a BSR or SR to the wireless network; and (iii) triggering a RA procedure with the wireless network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations.

Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
reestablishing, by a processor of an apparatus, a radio resource control (RRC) connection with a wireless network;
detecting, by the processor, whether a type of radio bearer service is resumed upon reestablishing the RRC connection; and
resuming, by the processor, the type of radio bearer service responsive to detecting that the type of radio bearer service is not resumed,
wherein the resuming of the type of radio bearer service comprises resuming by utilizing one or more of a plurality of recovery mechanisms comprising a recovery mechanism involving reestablishing a cell connection, and
wherein the recovery mechanism comprises:
triggering reestablishment with a first cell associated with the wireless network;
determining whether the type of radio bearer service is resumed upon reestablishment with the first cell; and
triggering reestablishment with a second cell associated with the wireless network responsive to determining that the type of radio bearer service is not resumed upon reestablishment with the first cell.

2. The method of claim 1, wherein the type of radio bearer service comprises a signaling radio bearer (SRB) type 2 (SRB2) service or a data radio bearer (DRB) service.

3. The method of claim 1, wherein the detecting of whether the type of radio bearer service is resumed comprises detecting by utilizing one or more of a plurality of detection mechanisms comprising:
an upper layer-driven detection mechanism,
a timer-driven detection mechanism, and
a lower layer-driven detection mechanism.

4. The method of claim 3, wherein the upper layer-driven detection mechanism comprises monitoring one or more of a plurality of services at an application layer or a non-access stratum (NAS) layer to determine whether the type of radio bearer service is resumed upon reestablishing the RRC connection.

5. The method of claim 4, wherein the plurality of services comprise an Evolved Packet System (EPS) Mobility Management (EMM) service, an EPS Session Management (ESM) service, an application service, and a voice over Long-Term Evolution (VoLTE) service.

6. The method of claim 3, wherein the timer-driven detection mechanism comprises determining, based on a timer, whether the type of radio bearer service is resumed within a predefined period.

7. The method of claim 3, wherein the lower layer-driven detection mechanism comprises monitoring for an occurrence of radio link failure (RLF) at a RRC layer.

8. The method of claim 7, wherein the monitoring for the occurrence of RLF comprises detecting a failure in message decoding due to a signal level of the message being below a predefined threshold.

9. The method of claim 1, wherein the resuming of the type of radio bearer service comprises resuming by utilizing one or more of a plurality of recovery mechanisms comprising:
an first recovery mechanism involving releasing the RRC connection,
a second recovery mechanism as the recovery mechanism involving the reestablishing of the cell connection, and
a third recovery mechanism involving resynchronization with the wireless network.

10. The method of claim 9, wherein the first recovery mechanism comprises:
releasing the RRC connection to enter an idle mode in response to receiving a paging message for a mobile-terminated call service; and
reestablishing a connection with the wireless network to enter a connected mode from the idle mode to resume the type of radio bearer service.

11. The method of claim 9, wherein third recovery mechanism comprises triggering a Layer 2 (L2) control signaling or procedure to resynchronize with the wireless network.

12. The method of claim 11, wherein the triggering of the L2 control signaling or procedure comprises performing one or more of:
triggering an Evolved Packet Data Converge Protocol (EPDCP) or Enhanced Relay Link Capacity (ERLC) status report;
transmitting a buffer status report (BSR) or scheduling request (SR) to the wireless network; and
triggering a random access (RA) procedure with the wireless network.

13. A method, comprising:
reestablishing, by a processor of an apparatus, a radio resource control (RRC) connection with a wireless network;
detecting, by the processor, whether a signaling radio bearer (SRB) type 2 (SRB2) service or a data radio bearer (DRB) service is resumed upon reestablishing the RRC connection; and
resuming, by the processor, the SRB2 service or the DRB service responsive to detecting that the SRB2 service or the DRB service is not resumed,
wherein the detecting of whether the SRB2 service or the DRB service is resumed comprises detecting by utilizing one or more of a plurality of detection mechanisms comprising:
an upper layer-driven detection mechanism,
a timer-driven detection mechanism, and
a lower layer-driven detection mechanism,
wherein the resuming of the SRB2 service or the DRB service comprises resuming by utilizing one or more of a plurality of recovery mechanisms comprising:
an first recovery mechanism involving releasing the RRC connection,
a second recovery mechanism involving reestablishing a cell connection by using an RRC reestablishment to resume a SRB type 1 (SRB1), and
a third recovery mechanism involving resynchronization with the wireless network.

14. The method of claim 13, wherein the upper layer-driven detection mechanism comprises monitoring one or more of a plurality of services at an application layer or a non-access stratum (NAS) layer to determine whether the SRB2 service or the DRB service is resumed upon reestablishing the RRC connection, and wherein the plurality of services comprise an Evolved Packet System (EPS) Mobility Management (EMM) service, an EPS Session Management (ESM) service, an application service, and a voice over Long-Term Evolution (VoLTE) service.

15. The method of claim 13, wherein the timer-driven detection mechanism comprises determining, based on a timer, whether the SRB2 service or the DRB service is resumed within a predefined period.

16. The method of claim 13, wherein the lower layer-driven detection mechanism comprises monitoring for an occurrence of radio link failure (RLF) at a RRC layer, and wherein the monitoring for the occurrence of RLF comprises detecting a failure in message decoding due to a signal level of the message being below a predefined threshold.

17. The method of claim 13, wherein the first recovery mechanism comprises:
releasing the RRC connection to enter an idle mode in response to receiving a paging message for a mobile-terminated call service; and
reestablishing a connection with the wireless network to enter a connected mode from the idle mode to resume the SRB2 service or the DRB service.

18. The method of claim 13, wherein the third recovery mechanism comprises triggering a Layer 2 (L2) control signaling or procedure to resynchronize with the wireless network, and wherein the triggering of the L2 control signaling or procedure comprises performing one or more of:
triggering an Evolved Packet Data Converge Protocol (EPDCP) or Enhanced Relay Link Capacity (ERLC) status report;
transmitting a buffer status report (BSR) or scheduling request (SR) to the wireless network; and
triggering a random access (RA) procedure with the wireless network.

19. The method of claim 13, wherein the second recovery mechanism comprises:
triggering reestablishment with a first cell associated with the wireless network;
determining whether the SRB2 service or the DRB service is resumed upon reestablishment with the first cell; and
triggering reestablishment with a second cell associated with the wireless network responsive to determining that the SRB2 service or the DRB service is not resumed upon reestablishment with the first cell.

\* \* \* \* \*